(12) United States Patent
Pinoteau

(10) Patent No.: US 11,312,384 B2
(45) Date of Patent: Apr. 26, 2022

(54) PERSONALIZED DEVICE AND METHOD FOR MONITORING A MOTOR VEHICLE DRIVER

(71) Applicant: VALEO COMFORT AND DRIVING ASSISTANCE, Créteil (FR)

(72) Inventor: Jérémie Pinoteau, Créteil (FR)

( * ) Notice: Subject to any disclaimer, the term of this patent is extended or adjusted under 35 U.S.C. 154(b) by 330 days.

(21) Appl. No.: 16/082,192

(22) PCT Filed: Mar. 1, 2017

(86) PCT No.: PCT/EP2017/054831
§ 371 (c)(1),
(2) Date: Sep. 4, 2018

(87) PCT Pub. No.: WO2017/149045
PCT Pub. Date: Sep. 8, 2017

(65) Prior Publication Data
US 2020/0290628 A1    Sep. 17, 2020

(30) Foreign Application Priority Data
Mar. 1, 2016  (FR) ...................................... 1651687

(51) Int. Cl.
*B60W 40/09*  (2012.01)
*B60W 30/08*  (2012.01)
(Continued)

(52) U.S. Cl.
CPC ............ *B60W 40/09* (2013.01); *B60W 30/08* (2013.01); *B60W 40/04* (2013.01); *G06V 20/597* (2022.01);
(Continued)

(58) Field of Classification Search
CPC .......... A61B 5/18; B60K 28/02; B60K 28/06; B60K 28/066; B60W 30/018;
(Continued)

(56) References Cited

U.S. PATENT DOCUMENTS 7,027,621 B1   4/2006  Prokoski
9,135,803 B1   9/2015  Fields et al.
(Continued)

FOREIGN PATENT DOCUMENTS

FR         3012029 A1      4/2015
WO     2008/018699 A1      2/2008
(Continued)

OTHER PUBLICATIONS

International Search Report issued in PCT/EP2017/054831 dated Jun. 6, 2017 (3 pages).
(Continued)

*Primary Examiner* — Stephen R Burgdorf
(74) *Attorney, Agent, or Firm* — Osha Bergman Watanabe & Burton LLP

(57) ABSTRACT

A personalized device for monitoring a motor vehicle driver is disclosed. The personalized device includes a device for measuring a driver monitoring parameter and a control unit that is programmed to estimate a state of alertness of the driver in accordance with an estimation rule and the measured value of said monitoring parameter, and determine said estimation rule in a personalized manner for said driver in accordance with a set of driver-specific data comprising at least said measured value of the monitoring parameter and multiple sets of predefined data, each of which corresponds to a predefined group of drivers.

15 Claims, 3 Drawing Sheets

(51) Int. Cl.
*G06V 20/59* (2022.01)
*B60W 40/08* (2012.01)
*B60W 40/04* (2006.01)

(52) U.S. Cl.
CPC . *B60W 2040/0818* (2013.01); *B60W 2420/42* (2013.01); *B60W 2540/229* (2020.02); *B60W 2555/20* (2020.02); *B60W 2556/40* (2020.02); *B60W 2556/55* (2020.02)

(58) Field of Classification Search
CPC ...... B60W 30/08; B60W 30/09; B60W 40/04; B60W 40/08; B60W 40/09; B60W 50/12; B60W 50/14; B60W 2040/0818; B60W 2040/0827; B60W 2420/42; B60W 2540/229; B60W 2555/20; B60W 2556/40; B60W 2556/55; G05D 1/0088; G06F 21/6218; G06K 9/00845; G06Q 30/0266; G06Q 40/08; G07C 5/08; G07C 5/085; G07C 5/0811; G08B 21/06; G09B 7/04; G09B 19/167
USPC .......................................................... 340/576
See application file for complete search history.

(56) References Cited

U.S. PATENT DOCUMENTS

| | | | | |
|---|---|---|---|---|
| 2005/0256635 | A1* | 11/2005 | Gardner | G01C 21/3641 701/431 |
| 2007/0063854 | A1* | 3/2007 | Zhang | B60W 40/09 340/576 |
| 2009/0010488 | A1* | 1/2009 | Matsuoka | B60W 30/08 382/100 |
| 2010/0182141 | A1* | 7/2010 | Yoon | G08B 21/06 340/439 |
| 2011/0169625 | A1* | 7/2011 | James | G06K 9/00597 340/439 |
| 2011/0202216 | A1* | 8/2011 | Thai-Tang | B60L 15/2045 701/22 |
| 2012/0109579 | A1* | 5/2012 | Kersey | G01F 9/00 702/182 |
| 2014/0019167 | A1* | 1/2014 | Cheng | G06Q 40/08 705/4 |
| 2014/0192325 | A1* | 7/2014 | Klin | A61B 3/112 351/209 |
| 2014/0210625 | A1* | 7/2014 | Nemat-Nasser | G08B 21/06 340/575 |
| 2014/0309866 | A1* | 10/2014 | Ricci | B60R 25/1004 701/36 |
| 2015/0235096 | A1 | 8/2015 | Konigsberg et al. | |
| 2016/0001781 | A1* | 1/2016 | Fung | G16H 50/20 701/36 |
| 2016/0055764 | A1* | 2/2016 | Kujala | G06K 9/00845 434/66 |
| 2016/0107646 | A1* | 4/2016 | Kolisetty | B60W 50/16 701/96 |
| 2017/0076396 | A1* | 3/2017 | Sudak | G07C 5/085 |
| 2021/0169417 | A1* | 6/2021 | Burton | A61B 5/02055 |

FOREIGN PATENT DOCUMENTS

| | | |
|---|---|---|
| WO | 2009/126071 A1 | 10/2009 |
| WO | 2014/177758 A1 | 11/2014 |

OTHER PUBLICATIONS

Written Opinion issued in PCT/EP2017/054831 dated Jun. 6, 2017 (7 pages).

* cited by examiner

PERSONALIZED DEVICE AND METHOD FOR MONITORING A MOTOR VEHICLE DRIVER

TECHNICAL FIELD

The present invention generally relates to the field of monitoring the driver of a motor vehicle.

More specifically, it relates to a device and to a method for monitoring said driver.

BACKGROUND OF INVENTION

It is known for the driver of a motor vehicle to be monitored in order to detect a possible loss of alertness (i.e. a loss of their ability to drive) that can result in insufficient control of the vehicle.

To this end, a driver monitoring parameter is measured and interpreted by a control unit so as to deduce information therefrom that relates to the state of alertness of the driver.

However, the measured parameter is difficult to interpret due to the significant differences that are encountered between drivers.

Furthermore, the existing solutions for adapting this interpretation to a specific driver are either unsatisfactory in terms of performance or are tedious to implement since they require active participation from the driver.

SUMMARY OF THE INVENTION

In order to overcome the aforementioned disadvantage of the prior art, the present invention proposes a device and a method for monitoring the driver allowing the interpretation of the measured monitoring parameter to be adapted in accordance with the driver of the vehicle, with minimal or no driver related constraints.

More specifically, the invention proposes a personalized device for monitoring a motor vehicle driver, comprising:
  a device for measuring a driver monitoring parameter;
  a control unit that is programmed to estimate a state of alertness of the driver in accordance with an estimation rule and the measured value of said monitoring parameter;
  the control unit being further programmed to determine said estimation rule in a personalized manner for said driver in accordance with a set of driver-specific data comprising at least said measured value of the monitoring parameter and multiple sets of predefined data, each of which corresponds to a predefined group of drivers.

Thus, by virtue of the device according to the invention, the estimation rule used by the control unit to interpret the measured value of the monitoring parameter, and to deduce therefrom the state of alertness of the driver, is adapted to the specific driver of the vehicle by virtue of learning that is monitored in a manner with minimal driver related constraints.

Indeed, the personalized estimation rule is determined by comparing a set of driver-specific data and multiple sets of predefined data corresponding to groups of drivers, each of which has a previously defined optimized group estimation rule.

Therefore, in order to determine the personalized estimation rule for the driver, said set of data relating thereto simply needs to be determined. This then can be carried out without any intervention from the driver or with very limited intervention from the driver.

Further non-limiting and advantageous features of the device according to the invention are as follows:
  each set of predefined data is associated with a predefined estimation rule and the control unit is programmed to identify the personalized estimation rule for the driver on one of said predefined estimation rules;
  the control unit is programmed to identify the personalized estimation rule for the driver on the predefined estimation rule associated with the set of predefined data closest to the set of driver-specific data;
  the control unit is programmed to determine the set of predefined data closest to the set of driver-specific data by comparing said set of driver-specific data and said sets of predefined data;
  the control unit comprises a learning algorithm adapted to determine the set of predefined data closest to said set of driver-specific data;
  said set of driver-specific data further comprise at least one of the following items of data;
  an item of data entered by the driver;
  an item of data relating to the environment of the driver;
  an item of data relating to the physiological behavior of the driver;
  an item of data relating to the driving of the driver;
  said monitoring parameter measured by the measuring device relates to the viewing direction of the driver and/or to the posture of the head of the driver and/or to the closure of the eyelids of the driver and/or to the movements of the steering wheel of the vehicle;
  the measuring device comprises at least one device for capturing an image of the head of the driver and said measured driver monitoring parameter is determined in accordance with at least one captured image of the head of the driver;
  the control unit is programmed to store the personalized estimation rule in relation to a driver identifier; and
  a device is provided for generating an alarm signal and wherein the control unit is programmed to trigger the generation of the alarm signal in accordance with the estimated state of alertness of the driver.

The invention also proposes a personalized method for monitoring the driver of a motor vehicle, comprising the following steps:
  recording a set of driver-specific data comprising at least one measured driver monitoring parameter;
  determining a personalized estimation rule for estimating a state of alertness of the driver in accordance with said measured driver monitoring parameter in accordance with said set of driver-specific data and multiple sets of predefined data, each of which corresponds to a predefined group of drivers;
  estimating a state of alertness of the driver by using said personalized estimation rule.

Further non-limiting and advantageous features of the device according to the invention are as follows:
  the steps of recording and of determining are carried out at predefined time intervals;
  with each set of predefined data being associated with a predefined estimation rule, the personalized estimation rule for the driver is identified on one of said predefined estimation rules;
  the personalized estimation rule for the driver is identified on the predefined estimation rule associated with the set of predefined data closest to the set of driver-specific data;
  the personalized estimation rule is stored in relation to a driver identifier; and when the step of estimating the state of alertness of the driver indicates that the alertness of the driver is insufficient, an alarm signal is emitted that is intended to improve the alertness of the driver.

BRIEF DESCRIPTION OF THE DRAWINGS

The following description, which is provided with reference to the accompanying drawings, which are provided by way of non-limiting examples, will provide an understanding of the nature of the invention and of how it can be produced.

In the accompanying drawings.

DETAILED DESCRIPTION OF THE INVENTION

Device

Figure 1:
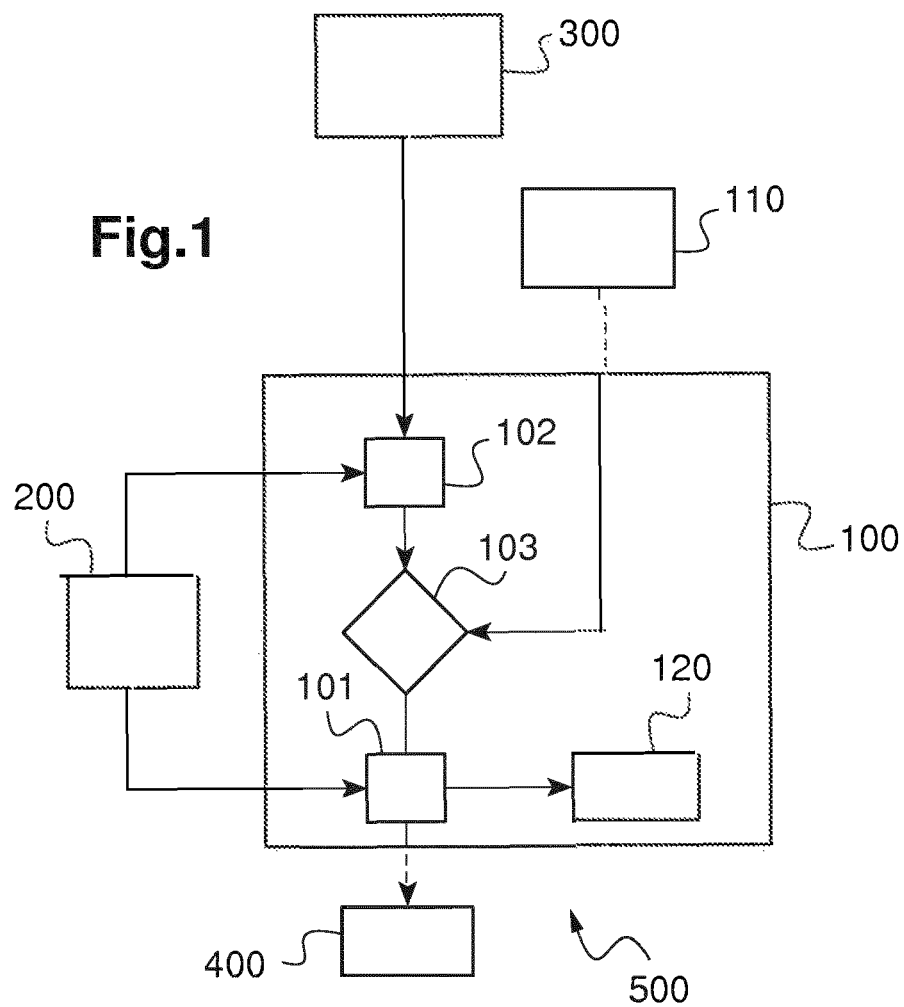
FIG. 1 schematically shows the various elements of the monitoring device according to the invention.

FIG. 1 schematically shows various elements of a monitoring device 500 according to the invention.

This monitoring device 500 comprises a device 200 for measuring a driver monitoring parameter and a control unit 100 that receives information from this measuring device 200.

Preferably, the measuring device 200 records driver-related information without interacting with the driver, and thus without disrupting them. In particular, the measuring device 200 does not emit any signal toward the driver. This has the advantage of allowing the measuring device 200 to record the natural behavior of the driver, without any disruption or restriction by the measuring device 200.

The device 200 for measuring the driver monitoring parameter therefore, in this case, does not interact with the driver.

By way of a variation, it is possible to contemplate the measuring device interacting with the driver. This particularly involves passive driver interaction, which is minimally intrusive, i.e. without requiring any intentional action by the driver.

More specifically, in the embodiment described herein, the measuring device 200 comprises at least one device for capturing an image of the head of the driver.

This image capturing device comprises, for example, a camera disposed in the vicinity of the central rear-view mirror of the vehicle or behind the steering wheel.

By way of a variation, it can comprise any image capturing device positioned so that the face of the driver, in their driving position, enters the field of this image capturing device.

For example, said monitoring parameter measured by the measuring device 200 relates to the viewing direction of the driver and/or to the posture of the head of the driver and/or to the closure of the eyelids of the driver.

This measured driver monitoring parameter is then determined in accordance with at least one image of the head of the driver captured by the measuring device 200.

This parameter can also be determined on the basis of two or more images of the head of the driver.

It then can also comprise statistical information determined on the basis of a plurality of captured images of the head of the driver.

In particular, when the driver monitoring parameter relates to the viewing direction of the driver, the image capturing device can comprise any device for monitoring the viewing direction that is known to a person skilled in the art. The monitoring parameter relating to the viewing direction of the driver particularly can be the viewing direction in a reference frame associated with the image capturing device or in a reference frame associated with the head of the driver, or the position of the pupils of the driver in such a reference frame. It can also comprise a period of focusing on the same point, i.e. the period during which the viewing direction in the reference frame associated with the head of the driver is approximately constant, or even the frequency of the focuses of the gaze.

The monitoring parameter can also comprise statistical information relating to a set of viewing directions measured from a plurality of image captures taken during a predefined period, for example, an average direction of the gaze, a standard deviation on this average direction, a statistical distribution of the viewing directions.

The driver monitoring parameter relating to the posture of the head can comprise a position and an orientation of the head of the driver in the reference frame associated with the image capturing device.

It can also comprise, for example, statistical information relating to a set of postures measured from a plurality of image captures taken during a predefined period, such as the average speed of the movements of the head and the standard deviation on this average or a frequency of the extreme positions (wide angles) of the head.

The driver monitoring parameter relating to the closure of the eyelids of the driver can comprise a closure frequency of the eyelids, a closure period of the eyelids, a speed of closure of the eyelids or statistical information of the mean type or statistical distribution of the frequency or of the closure period of the eyelids of the driver.

In particular, in an example that is described hereafter, the monitoring parameter is the PERCLOS parameter, i.e. the proportion of time during which the closure of the eyelids of the driver is between 80% and 100% of the total closure of the eyelids, in a fixed predefined time interval, set to 60 seconds in the following example. It can also involve any statistical information that is determined on the basis of a plurality of measured values of this PERCLOS parameter.

In the figures, the values of the PERCLOS parameter are normalized, with 0 corresponding to a proportion of 0% and 1 corresponding to a proportion of 100%. Only the range of values of this parameter between 0 and 0.2 is shown in these figures.

The measuring device 200 can also comprise two image capturing devices allowing a three-dimensional image of the head of the driver to be reconstituted by stereoscopy.

By way of a variation, the measuring device can comprise other types of sensors allowing other types of monitoring parameters to be measured, in addition to at least one of the previously mentioned monitoring parameters, or by replacing this monitoring parameter.

For example, the measuring device can comprise a sensor adapted to measure the hand pressure on the steering wheel of the vehicle or the movements applied to the steering wheel by the driver.

The monitoring parameter then can relate to the intensity of the hand pressure on the steering wheel or to the movement of the steering wheel, for example, to the angular position of said steering wheel.

The measuring device can comprise, for example, one or more biometric sensor(s) allowing measurement, for example, of the heart rate of the driver and/or the frequency and/or the amplitude of a variation in the size of the pupil of the driver and/or the cutaneous conduction and/or the blood pressure and/or the body temperature and/or the respiration rate and/or the blood sugar level and/or the brain activity of the driver.

The control unit 100 of the monitoring device 500 according to the invention is programmed to estimate a state of alertness of the driver in accordance with a personalized estimation rule and the measured value of said monitoring parameter.

The personalized estimation rule is implemented by a first estimation module 101 of the control unit 200 (FIG. 1).

This estimation rule comprises, as output, a plurality of possible driver alertness levels. At least two levels are provided that correspond to satisfactory or insufficient alertness. Preferably, at least three alertness levels are provided. For example, the following levels are provided to estimate the possible drowsiness of the driver: alert aware, loss of alertness, drowsiness and, optionally, sleepiness. The following levels can be provided to estimate the distraction of the driver: concentration, minor distraction, major distraction.

It is also possible to estimate the visual distraction of the driver and the cognitive distraction of the driver. Visual distraction can be estimated, for example, in accordance with the viewing direction of the driver. Cognitive distraction is estimated, for example, by additional information transmitted by other devices of the vehicle, such as the activation of the wireless connection of a mobile telephone to the vehicle or the switching on of a music playing device.

For example, when the driver monitoring parameter comprises a frequency and/or a period and/or a speed of closure of the eyelids of the driver, the estimation rule can comprise a comparison between the measured frequency or period or speed value with a threshold frequency, period or speed value. When the measured frequency or period value is greater than the threshold frequency or period value, the estimation rule sends as output a state of alertness of the driver indicating that they are drowsy or are insufficiently alert.

In particular, in a simple example, the estimation rule used when the monitoring parameter is the previously defined PERCLOS parameter comprises a comparison with a threshold value of this parameter. When the measured value of the PERCLOS parameter is greater than the threshold value of this parameter, the estimation rule indicates that the driver is in a drowsy state, whereas when it is lower, the estimation rule indicates that the driver is in an alert aware state.

According to another example, said estimation rule is determined by a learning algorithm adapted to establish a causality structure between the monitoring parameter and the state of alertness of the driver. This learning algorithm is initially trained using an initial predefined database comprising pairs of monitoring parameter/predefined associated state of alertness input variables.

This can involve, for example, a Bayesian learning algorithm, a perceptron type neural network, a deep learning algorithm, a support vector machine or a forest of decision trees. It can also involve any other type of suitable learning algorithm that is known to a person skilled in the art.

This initial database comprises data relating to various drivers, so that the performance levels of the estimation rule are optimized for these drivers.

The learning algorithm determines, for example, on the basis of this database, the probability of determining a given state of alertness of the driver, knowing that the monitoring parameter has said measured value.

The estimation rule returns as output, on the basis of the learning algorithm, the most probable alertness level in accordance with the measured value of the driver monitoring parameter.

By way of a variation, the control unit 100 can also receive additional information transmitted by other devices of the vehicle, such as information relating to GPS, acceleration/braking, activation of certain vehicle functions, such as, for example, the activation of the wireless connection of a mobile telephone to the vehicle. This additional information, as well as information indicating a driving trajectory that is inappropriate for the road, such as information relating to the movements of the steering wheel or the lateral acceleration of the vehicle or the reception of a telephone call by the driver, can be taken into account in the estimation rule for determining the state of alertness of the driver.

In a noteworthy manner, in the monitoring device according to the invention, the control unit is also programmed to determine said estimation rule in a personalized manner for said driver in accordance with a set of driver-specific data comprising at least said measured value of the monitoring parameter and multiple sets of predefined data, each of which corresponds to a predefined group of drivers.

To this end, the control unit 100 is programmed to record a set of driver-specific data, comprising at least said measured driver monitoring parameter.

This set of data is recorded, for example, in a storage module 102 of the control unit 100 (FIG. 1).

Said set of driver-specific data can comprise, for example, a plurality of values of said monitoring parameter measured during one or more trips of the driver.

Said set of driver-specific data can also comprise, for example, in addition to the values of the measured monitoring parameter, at least one of the following items of data:
an item of data entered by the driver;
an item of data relating to the environment of the driver;
an item of data relating to the physiological behavior of the driver;
an item of data relating to the driving of the driver.

This data is measured, determined or computed by other data recovery devices, schematically shown using reference 300 in FIG. 1.

These other data recovery devices can comprise, for example, an acquisition interface, by virtue of which the driver can manually enter their information. This can involve, for example, completing a questionnaire specifying their age, driving experience, general state of fatigue, an estimate of their stress level or their amount of sleep the previous night.

These other data recovery devices can also comprise various sensors disposed in the vehicle and transmitting measured information to the control unit 100 that relates to the operation of the vehicle, for example, exhaust gas temperature/pressure, lateral and frontal acceleration of the vehicle, speed of the vehicle, pivoting angle of the steering wheel.

They can also comprise the control unit itself, which determines numerous operating parameters of the vehicle, such as the speed or the point of operation of the vehicle, the acceleration/braking demand of the driver, the activation of some of the vehicle functions such as, for example, the activation of the wireless connection of a mobile telephone to the vehicle.

They can also comprise a system for determining the position of the vehicle, of the GPS type, and/or a device for determining the external climatic conditions, for example, the temperature of the air outside and/or inside the vehicle and/or of the road, the humidity of the air and/or of the road, the ambient noise level.

Finally, it can comprise one or more biometric sensor(s) allowing data to be recorded that relates to the physiological behavior of the driver, for example, the heart rate of the driver and/or the cutaneous conduction and/or the blood pressure and/or the body temperature and/or the respiration rate and/or the blood sugar level of the driver and/or the brain activity of this driver.

The sets of predefined data each corresponding to a predefined group of drivers are pooled and accessible to all vehicles. In this way, they are universal and not personalized.

They are independent of the driver of the vehicle.

These sets of predefined data nevertheless can change over time so as to refine the personalization of the estimation rule.

Preferably, the monitoring device 500 then comprises at least one server 110 outside the vehicle, on which server the sets of predefined data are stored and which is remotely accessed by the control unit 100 through a wireless connection of the 4G network type, for example. The control unit then can have access thereto at any time.

By way of a variation, it may be contemplated for the control unit to only access the external server during certain stoppages of the vehicle, for example, at the home of the driver or during the technical inspections of the vehicle. A wireless connection to the Wi-Fi network than can be contemplated, as can a wired connection.

This advantageously allows regular updating of the sets of predefined data loaded by the control unit 100.

By way of a variation, the control unit comprises a memory that contains the sets of predefined data.

Preferably, each set of predefined data is associated with a predefined estimation rule and the control unit 100 is programmed to identify the personalized estimation rule for the driver on one of said predefined estimation rules.

More specifically, in this case, the control unit 100 is programmed to identify the personalized estimation rule for the driver on the predefined estimation rule associated with the set of predefined data closest to the set of driver-specific data.

According to a first embodiment, the control unit 100 is programmed to compare said set of driver-specific data stored in the storage module 102 and said sets of predefined data each corresponding to a predefined group of drivers.

To this end, the control unit 100 further comprises a comparison module 103 that performs said comparison. This comparison module 103 receives the set of driver-specific data originating from the monitoring device 200 and the other data recovery devices 300 and the sets of predefined data from the external server 110.

The comparison is used to determine which set of predefined data is closest to the set of driver-specific data.

To this end, the control unit 100 is programmed, for example, to compare the corresponding data with each other and to quantify the difference between this data, then to determine an overall difference factor between the set of driver-specific data and each set of predefined data by weighted adding of the differences between corresponding data.

The control unit 100 is then programmed to determine the predefined set of data closest to the set of driver-specific data as being the set for which the overall difference with the set of driver-specific data is lowest.

In a variation, the control unit 100 is programmed to compare at least one feature of a statistical distribution of the set of driver-specific data with the statistical distribution of the predefined values of this parameter included in each set of predefined data.

This can involve, for example, as is the case in the example described in greater detail hereafter, comparing the features of the statistical distribution of the measured values of the monitoring parameter with the statistical distribution of the predefined values of this parameter included in each set of predefined data. The control unit is then programmed to determine which set of predefined data comprises the values of the monitoring parameter for which the statistical distribution is closest to that of the values measured for the driver.

In order to quantify the differences between corresponding data, various metrics of distribution functions can be used that are associated with said data or with distances between the various instants of the distributions (differences between the means, between the standard deviations, or the distance between the pairs (mean, standard deviation).

Finally, it can involve, in another variation, comparing the features of curves representing data relating to the driver and predefined data. This then involves determining the set of predefined data having the representative curve that is closest to that of the driver-specific data.

According to a second embodiment, the control unit 100 comprises a learning algorithm adapted to determine the set of predefined data closest to said set of driver-specific data.

This learning algorithm is, for example, trained on a database comprising various sets of data with their closest associated set of predefined data.

The sets of predefined data are determined in a prior step, on the basis of data gathered from various drivers and of the statistical processing of this data.

They can be obtained, for example, by virtue of a learning algorithm, on the basis of data recorded during trips by numerous drivers. This learning algorithm identifies the correlations between the data of some drivers and automatically consolidates the data of these drivers in order to form said sets of predefined data.

Figure 3:
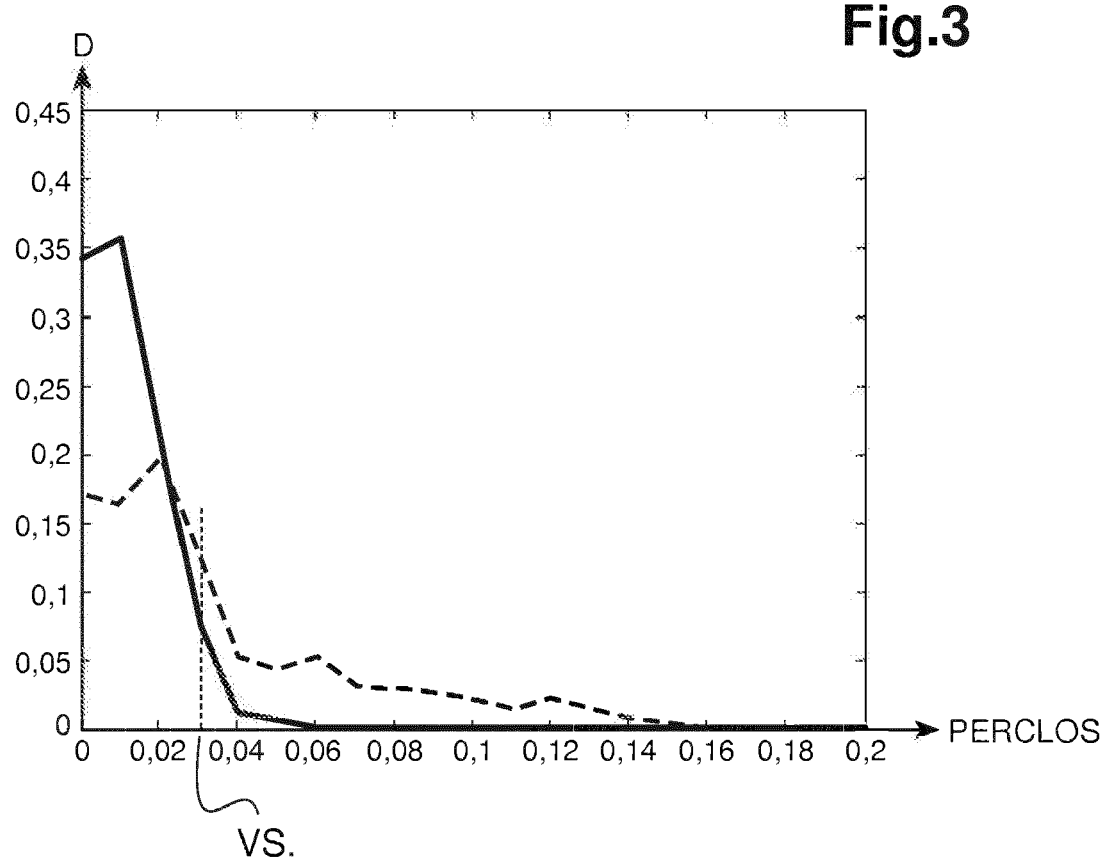
FIG. 3 schematically shows the overall distributions (densities D in accordance with the PERCLOS value) of the values of the PERCLOS parameter measured for six different drivers, in an alert aware state (solid line) and in a drowsy state (dashed line)

FIG. 3 shows, for example, the data gathered from six different drivers. This data comprises, for each driver, a plurality of measured values of the PERCLOS parameter and the corresponding state, alert or drowsy, of the driver. The density is shown in this case in accordance with the measured value of the PERCLOS parameter (between 0 and 1). A density curve represents the relative proportion of the various values of the PERCLOS within the set of measured values of the PERCLOS.

Processing this data shows that two groups of three drivers can be distinguished.

Figure 4:
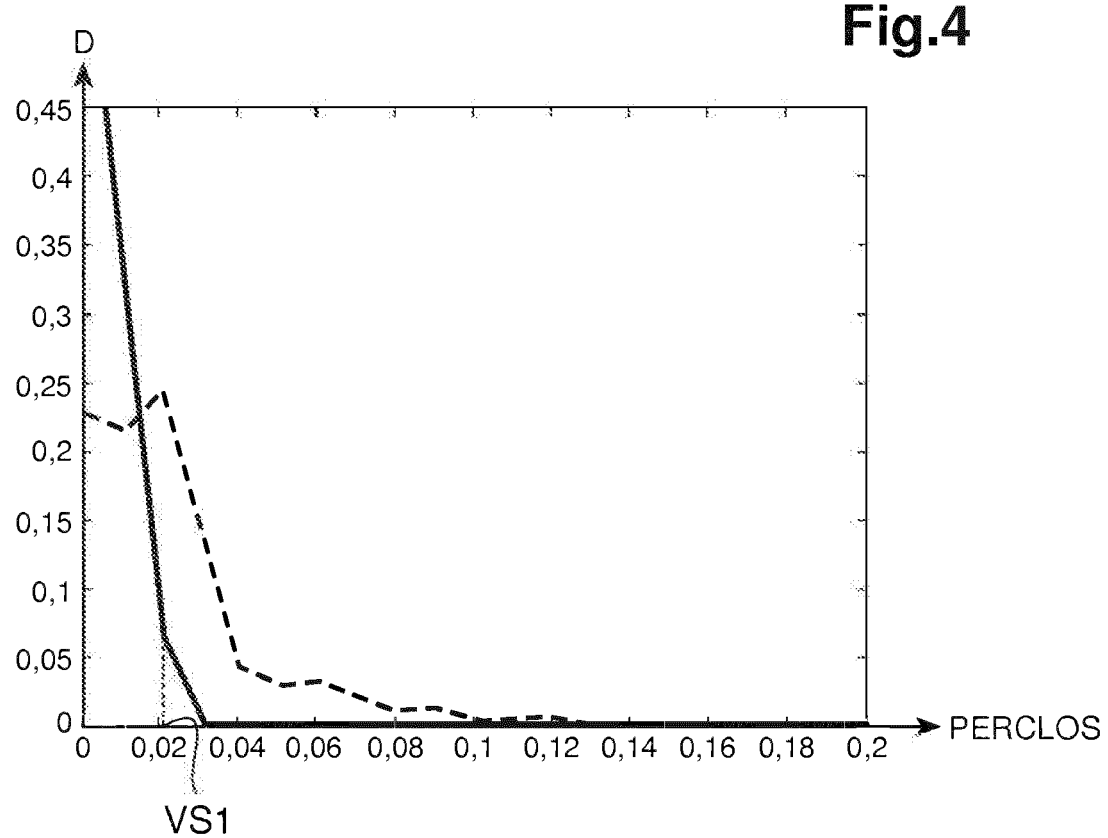
FIG. 4 schematically shows the distributions (densities D in accordance with the PERCLOS value) of the values of the PERCLOS parameter measured for a first group of three drivers from among the six drivers of FIG. 3, in an alert aware state (solid line) and in a drowsy state (dashed line)

For a first group, the data of which are particularly shown in FIG. 4, the first threshold value VS1 of the PERCLOS parameter allowing an effective distinction to be made between the alert aware state and the drowsy state is approximately 0.02.

Figure 5:
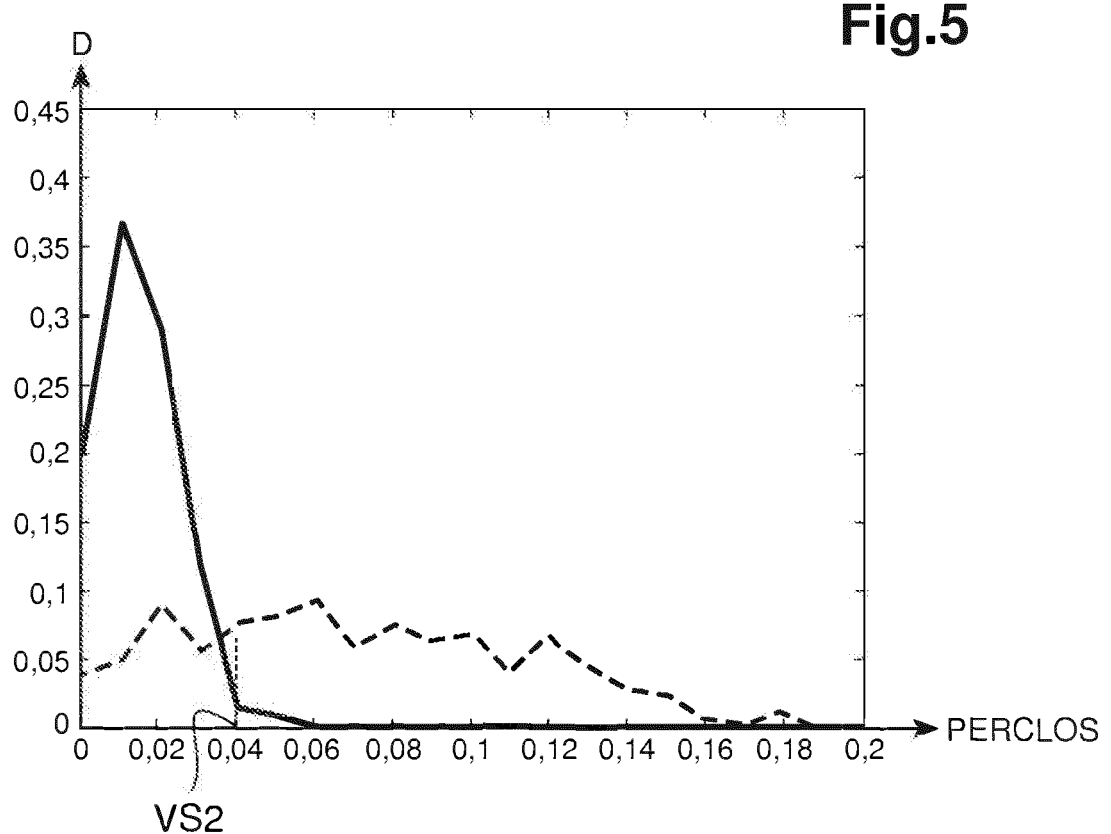
FIG. 5 schematically shows the distributions (densities D in accordance with the PERCLOS value) of the values of the PERCLOS parameter measured for a second group of three drivers from among the six drivers of FIG. 3, in an alert aware state (solid line) and in a drowsy state (dashed line).

For a second group, the data of which are more specifically shown in FIG. 5, the second threshold value VS2 of the PERCLOS parameter allowing an effective distinction to be made between the alert aware state and the drowsy state is approximately 0.04.

Two sets of predefined data are thus defined that correspond to the data of the drivers of group 1 or of group 2.

For each set of predefined data, an associated group estimation rule is optimized in order to estimate the state of alertness of the driver as precisely as possible, so as to reliably detect any situations in which the alertness of the driver is insufficient and to avoid the emission of unwarranted alarm signals, as explained hereafter.

For example, in this case, the estimation rule associated with the first group of drivers will use a first threshold value VS1 equal to 0.02, whereas the estimation rule associated with the second group of drivers will use a second threshold value VS2 equal to 0.04 of the PERCLOS parameter.

In general, the threshold values of the estimation rules are thus adjusted in accordance with the predefined data of the considered group of drivers.

When the group estimation rule is determined by a learning algorithm, the initial database used to train this learning algorithm comprises the pairs of monitoring parameter/alertness state input variables associated with the drivers of the group of drivers to which the set of predefined data corresponds. The control unit 100 is programmed to determine, in accordance with the completed comparison, the personalized estimation rule for the driver as being the group estimation rule associated with the set of predefined data closest to the set of driver-specific data.

In the case of the example of the PERCLOS parameter, a plurality of measured values of this parameter is acquired by the monitoring device according to the invention, for example, 10,000 measured values over several vehicle driving hours. The distribution of these measured values is compared to the distribution of the predefined values of the drivers of the first and of the second group previously described, by comparing, for example, the instants of these distributions, such as their means, standard deviations, dissymmetry coefficient and/or flattening coefficient, or other statistical features of these distributions, such as the median or the percentiles.

More specifically, in this case, it is the group of drivers for which the distribution of the predefined values has the mean that is closest to the mean of the distribution of the measured values of the PERCLOS parameter of the driver that is selected by the comparison step.

Thus, if the mean value of the distribution of measured values of the PERCLOS parameter is closest to the mean value of the distribution of the predefined values of the PERCLOS parameter of the first group of drivers, the control unit 100 associates the estimation rule of the first group with the vehicle driver. In the example described above, it is therefore the first threshold value VS1 that is used to estimate the state of alertness of the driver.

If the average value of the distribution of measured values of the PERCLOS parameter is closer to the mean value of the distribution of the predefined values of the PERCLOS parameter of the second group of drivers, then the estimation rule associated with the second group is used.

Throughout the remainder of the operation of the vehicle, when it is driven by the driver in question, the control unit 100 is programmed to estimate the state of alertness of the driver by using said personalized estimation rule for this driver.

In a particularly advantageous manner, the relevant motor vehicle to this end further comprises a driver recognition system.

This recognition system automatically identifies the vehicle driver from a stored list of drivers. This recognition system is based, for example, on the facial recognition of the driver on an image of the head of the driver, on processing biometric information (such as a fingerprint) or on the identification of a contact key used by the driver.

This recognition system then sends a driver identifier to the control unit 100, which is programmed to store the personalized estimation rule related to this driver identifier.

The control unit 100 is then programmed to use the personalized estimation rule associated with the driver identifier recognized upon start-up of the vehicle.

Thus, once the driver is automatically identified by the vehicle, the control unit 100 uses the personalized estimation rule for this driver. This allows the monitoring of the driver to be personalized.

With the estimation rule being defined in accordance with the driver, the number of unwarranted alarm signals is reduced, which improves the comfort of the driver, and leads them to better accept the monitoring device. Furthermore, as the rule is more precise, the monitoring device allows the emission of alarm signals to be controlled over a greater number of situations of drowsiness or inattentiveness and the safety of the vehicle and of its passengers is improved.

In the example shown in the figures, the precision of the estimation rule associated with the first group of drivers is 74%, whereas the precision of the estimation rule associated with the second group of drivers is 87%. By way of a comparison, a generic estimation rule, the threshold value of which would be determined on the basis of the set of data of the six drivers, would have a threshold value VS of the PERCLOS parameter that is equal to 0.03 (shown in FIG. 3) and precision of 68%. The performance levels of the personalized estimation rule therefore are improved compared to the generic estimation rule.

The monitoring device 500 further comprises a device for emitting an alarm signal 400 (FIG. 1).

In accordance with the level of alertness of the driver that is estimated by the control unit 100, this is programmed so that it may or may not control the emission of an alarm signal intended for the driver.

The alarm signal emitted by the alarm signal emission device can be visual, audible or haptic. It involves, for example, blinking or a luminous flash or an audible warning or vibration in the steering wheel or the driver seat.

Furthermore, regardless of the result of the comparison, the measured value of the monitoring parameter and, optionally, the associated reference state of alertness are stored in a register 120 corresponding to the result of the comparison, so as to authorize monitoring of the performance levels of the personalized estimation rule.

Each item of data stored in the register 120 is also preferably associated with the identifier of the corresponding driver.

Method

Figure 2:
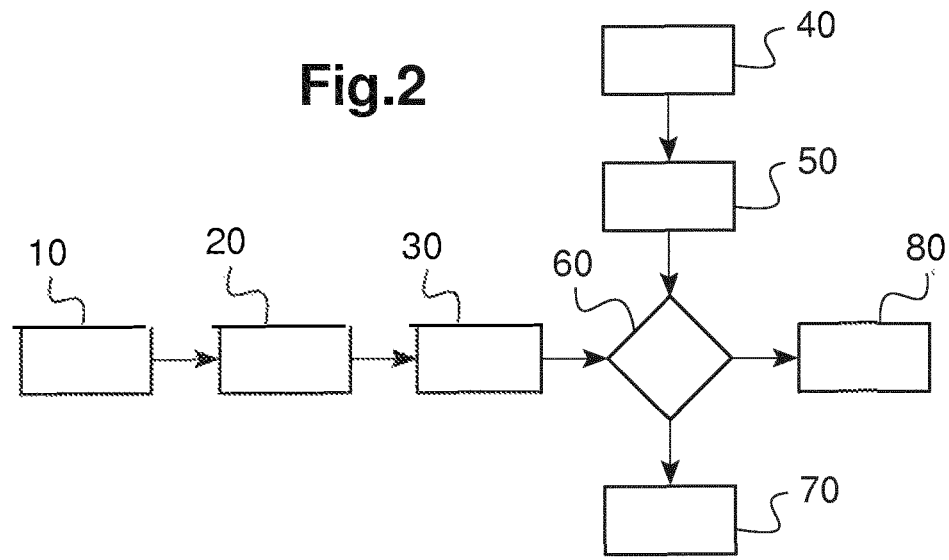
FIG. 2 schematically shows the various steps of the monitoring method according to the invention.

FIG. 2 schematically shows the steps of the personalized monitoring method according to the invention.

In practice, when the driver enters and starts the vehicle, they are automatically identified by the recognition device, as previously described.

The driver drives the vehicle as normal, without any particular restriction.

The personalized monitoring method according to the invention is implemented while the vehicle is driven by the driver. According to this method:
- a set of driver-specific data is recorded (block 10 of FIG. 2), which set comprises at least one measured driver monitoring parameter;
- a personalized estimation rule is determined (blocks 30 and 40 of FIG. 2) to estimate a state of alertness of the driver in accordance with said measured driver monitoring parameter, in accordance with said set of driver-specific data and multiple sets of predefined data, each of which corresponds to a predefined group of drivers;
- a state of alertness of the driver is estimated (block 50 of FIG. 2) by using said personalized estimation rule.

In the embodiment shown herein, the estimation rule is determined by the following steps:
- comparing (block 30 of FIG. 2) said set of driver-specific data and multiple sets of predefined data, each of which corresponds to a predefined group of drivers;
- determining (block 40 of FIG. 2), in accordance with this comparison, a personalized estimation rule for estimating a state of alertness of the driver in accordance with said measured driver monitoring parameter.

Said monitoring parameter is previously measured using the measuring device 200.

Furthermore, preferably, the modified estimation rule is stored in relation to the driver identifier (block 70 of FIG. 2) previously determined by the recognition device.

Finally, when the step of estimating the state of alertness of the driver indicates that the alertness of the driver is insufficient, an alarm signal is emitted that is intended to improve the alertness of the driver (block 60 of FIG. 2).

Preferably, in order to estimate the state of alertness of the driver, a plurality of measured values of the monitoring parameter is measured and the state of alertness of the driver is estimated in accordance with the personalized estimation rule and this plurality of measured values.

In this case, the measuring device 200 determines at least one measured value of the monitoring parameter, preferably a plurality of measured values of this monitoring parameter. The control unit 100 receives these measured values of the monitoring parameter.

More specifically, in this case, the measuring device 200 captures a plurality of images of the head of the driver.

The control unit 100 receives and processes these images, for example, by identifying, on each image, the eyes of the driver and, more specifically, the position of the eyelids and/or of the pupils of the driver. It is also possible to identify the position of reflections of light sources on the cornea. The control unit 100 deduces, from these positions, the value of the driver monitoring parameter, for example, the viewing direction, the position of the eyelids of the driver and/or the PERCLOS parameter.

The control unit 100 also preferably receives the other data that is determined, measured or computed by the other data recovery devices 300. The set of driver-specific data that is thus compiled is stored in the storage module 102 of the control unit 100.

The control unit 100 connects to the external server 110, for example, by virtue of the wireless 4G communication network, and loads the sets of predefined data stored on this external server.

The comparison module 103 of the control unit 100 compares the set of driver-specific data and the sets of predefined data, as previously described.

It deduces therefrom the set of predefined data closest to the set of driver-specific data and sends the group estimation rule associated with the set of identified predefined data to the estimation module 101 of the control unit.

The estimation module 101 also receives the measured values of the monitoring parameter from the measuring device 200 or from the recording module 102.

It deduces the estimated state of alertness of the driver therefrom.

Preferably, the estimation module 101 sends the personalized estimation rule so that it can be stored in the register 120 in relation to the driver identifier. In particular, the threshold values of the monitoring parameters or the database of the learning algorithm of the estimation rule are particularly stored, in correspondence with the driver identifier.

Thus, when the driver is identified by the vehicle recognition system upon start-up, the control unit 100 loads the personalized estimation rule associated with this specific driver.

Since the personalized estimation rule is specifically adapted to the driver, their performance levels are improved. The number of unwarranted alarm signals is reduced and the driver is not tempted to deactivate the monitoring device.

The control unit stores the measured values of the monitoring parameter, the state of alertness estimated by the personalized estimation rule and the reference state of alertness.

Thus, the performance levels of the personalized estimation rule can be precisely monitored.

Preferably, the steps of recording, comparing and determining are carried out at predefined time intervals. Thus, the personalized estimation rule can be updated, in accordance with any possible change in the behavior of the driver or with a change in the sets of predefined data, which can be refined so as to improve the precision of the associated group estimation rule.

It may be contemplated, by way of a variation, for each set of predefined data to be subdivided into a plurality of sub-sets of data, and for the comparison step to also allow the sub-set closest to the set of driver-specific data to be identified.

It particularly may be contemplated for the set of driver-specific data and each set of predefined data to comprise various sub-sets comprising various types of data, for example, originating from various measuring or data recovery devices. The corresponding sub-sets are then compared to determine the predefined sub-sets closest to the driver-specific sub-sets and the predefined set of data closest to the set of driver-specific data is deduced therefrom.

By way of a variation, as previously stated, determining the set of predefined data closest to the set of driver-specific data, by virtue of a learning algorithm, and identifying the personalized estimation rule associated with this closest predefined set of data is contemplated.

The invention claimed is:

1. A personalized device for monitoring a driver of a motor vehicle, comprising:
    a device that measures a driver monitoring parameter; and
    a control unit that is programmed to:
        estimate a state of alertness of the driver based on an estimation rule and the measured driver monitoring parameter,
        determine said estimation rule in a personalized manner for said driver based on a set of driver-specific data comprising at least the measured driver monitoring parameter and multiple sets of predefined data, each of which corresponds to a predefined group of drivers, and store the personalized estimation rule in relation to a driver identifier, wherein the estimation rule comprises a threshold for at least one of a speed, a frequency, and a period of closure of an eyelid of the driver of the motor vehicle, wherein the threshold is determined based on a set of data obtained from at least three drivers, and wherein the predefined group of drivers comprises at least six drivers, and wherein the state of alertness is based on additional information comprising information indicating a driving trajectory that is inappropriate for a specific road type and information indicating a wireless connection of a mobile telephone on the motor vehicle.

2. The personalized monitoring device as claimed in claim 1, wherein each set of predefined data is associated with a predefined estimation rule and the control unit is programmed to identify the personalized estimation rule for the driver on one of said predefined estimation rules.

3. The personalized monitoring device as claimed in claim 2, wherein the control unit is further programmed to:
determine the set of predefined data closest to the set of driver-specific data; and
identify the personalized estimation rule for the driver on the predefined estimation rule associated with the set of predefined data closest to the set of driver-specific data.

4. The personalized monitoring device as claimed in claim 3, wherein the control unit is programmed to determine the set of predefined data closest to the set of driver-specific data by comparing said set of driver-specific data and said sets of predefined data.

5. The personalized monitoring device as claimed in claim 3, wherein the control unit comprises a learning algorithm adapted to determine the set of predefined data closest to said set of driver-specific data.

6. The personalized monitoring device as claimed in claim 1, wherein said set of driver-specific data further comprises at least one of the following items of data:
an item of data entered by the driver;
an item of data relating to the environment of the driver;
an item of data relating to the physiological behavior of the driver; and
an item of data relating to the driving of the driver.

7. The personalized monitoring device as claimed in claim 1, wherein said monitoring parameter measured by the measuring device relates to the viewing direction of the driver and/or to the posture of the head of the driver and/or to the closure of the eyelids of the driver and/or to the movement applied to the steering wheel by the driver.

8. The personalized monitoring device as claimed in claim 1, wherein the measuring device comprises at least one device for capturing an image of the head of the driver and said measured driver monitoring parameter is determined in accordance with at least one captured image of the head of the driver.

9. The personalized monitoring device as claimed in claim 1, wherein a device is provided for generating an alarm signal and wherein the control unit is programmed to trigger the generation of the alarm signal in accordance with the estimated state of alertness of the driver.

10. A personalized method for monitoring a driver of a motor vehicle, comprising:
recording a set of driver-specific data comprising at least one measured driver monitoring parameter;
determining a personalized estimation rule for estimating a state of alertness of the driver in accordance with said measured driver monitoring parameter in accordance with said set of driver-specific data and multiple sets of predefined data, each of which corresponds to a predefined group of drivers;
storing the personalized estimation rule in relation to a driver identifier;
estimating a state of alertness of the driver by using said personalized estimation rule,
wherein the estimation rule comprises a threshold for at least one of a speed, a frequency, and a period of closure of an eyelid of the driver of the motor vehicle,
wherein the threshold is determined based on a set of data obtained from at least three drivers,
wherein the predefined group of drivers comprises at least six drivers, and
wherein the state of alertness is based on additional information comprising information indicating a driving trajectory that is inappropriate for a specific road type and information indicating a wireless connection of a mobile telephone on the motor vehicle.

11. The personalized monitoring method as claimed in claim 10, wherein the recording and determining are carried out at predefined time intervals.

12. The personalized monitoring method as claimed in claim 10, wherein, with each set of predefined data being associated with a predefined estimation rule, the personalized estimation rule for the driver is identified on one of said predefined estimation rules.

13. The personalized monitoring method as claimed in claim 12, wherein the personalized estimation rule for the driver is identified on the predefined estimation rule associated with the set of predefined data closest to the set of driver-specific data.

14. The personalized monitoring method as claimed in claim 10, wherein the personalized estimation rule is stored in relation to a driver identifier.

15. The personalized monitoring method as claimed in claim 10, wherein, when the step of estimating the state of alertness of the driver indicates that the alertness of the driver is insufficient, an alarm signal is emitted that is intended to improve the alertness of the driver.

* * * * *